United States Patent [19]

Cramm et al.

[11] Patent Number: 5,215,679
[45] Date of Patent: Jun. 1, 1993

[54] AQUEOUS EMULSIONS OF RESINS CONTAINING FLUORESCENT DYES

[75] Inventors: Jeffrey R. Cramm, Winfield, Ill.; Steven G. Streitel, Brecksville, Ohio

[73] Assignee: Day-Glo Color Corp., Cleveland, Ohio

[21] Appl. No.: 850,227

[22] Filed: Mar. 12, 1992

Related U.S. Application Data

[63] Continuation of Ser. No. 645,364, Jan. 24, 1991, abandoned.

[51] Int. Cl.⁵ .................. C09K 11/06; C08L 41/00; C08L 33/10; C08L 25/04
[52] U.S. Cl. .................. 252/301.35; 524/547; 524/560; 524/565; 524/577
[58] Field of Search .......... 524/547; 252/301.35

[56] References Cited

U.S. PATENT DOCUMENTS

| | | | |
|---|---|---|---|
| 4,016,133 | 4/1977 | Hyosu et al. | 524/717 |
| 4,302,350 | 11/1981 | Callicott . | |
| 4,623,689 | 11/1986 | Shintani et al. . | |
| 5,003,000 | 3/1991 | Bock et al. | 524/827 |

Primary Examiner—Joseph L. Schoffer
Assistant Examiner—Wu C. Cheng
Attorney, Agent, or Firm—Calfee, Halter & Griswold

[57] ABSTRACT

An aqueous emulsion of a resin which contains a fluorescent dye comprising:

| INGREDIENTS | % BY WEIGHT |
|---|---|
| A water insoluble tetra polymer | 25-50 |
| Fluorescent Dye | .1-10 |
| Anionic Emulsifier | .2-10 |
| Water | Balance | with the tetra polymer comprising:

| INGREDIENTS | % BY WEIGHT |
|---|---|
| A. A water insoluble vinyl monomer free of polar groups. | 52-65 |
| B. Acrylonitrile | 25-35 |
| C. A vinyl monomer containing sulfonate groups. | 1.5-4.5 |
| D. A polar vinyl monomer from the group consisting of: 1. Polar acrylate esters 2. Vinyl acetate 3. A substituted acrylamide containing OH or carboxylic ester groups | 5-15 |

17 Claims, No Drawings

AQUEOUS EMULSIONS OF RESINS CONTAINING FLUORESCENT DYES

This is a continuation of copending application Ser. No. 07/645,364, filed on Jan. 24, 1991, now abandoned.

INTRODUCTION

Daylight fluorescent pigments absorb radiation in both the ultraviolet and visible ranges of the spectrum and emit visible light by fluorescence. The emitted light adds to the normal reflected color to give brilliant colors which appear to glow in normal daylight. The effect can be very striking. A fluorescent orange color can be up to three times brighter than a conventional orange color in daylight.

Finely divided pigments of colored resins heretofore have been prepared by coloring a resin prepared in advance with a dyestuff and pulverizing the colored resin to finely divided particles. U.S. Pat. Nos. 2,928,873 and 3,116,256 disclose a process for obtaining colored resin particles where a condensate of an aminotriazine compound and an aromatic monosulfonamide compound with formaldehyde is employed as the substrate resin. It is colored with a dyestuff and then ground to produce particles having a particle size greater than one micron.

The art is interested in developing water based submicron size fluorescent pigments for graphic arts applications such as textile printing inks, flexographic printing inks, and marker inks. Water continuous emulsion polymerization of vinyl type monomers is a well known polymerization technique which produces particles in this size range. By choosing a polymer matrix which is a good solvent for fluorescent dyes, highly fluorescent pigment particles can be prepared by polymerization in the presence of dyes.

These types of products could be designed for several applications. The areas of graphic arts which involve thin film printing would benefit considerably from smaller pigment particle size. These include textile, gravure, and flexographic printing.

There are several potential advantages of vinyl emulsion pigment technology over current technology in these areas, e.g.;

1. Pigment particle sizes in the submicron range would be available.
2. No grinding process is involved in making the pigments.
3. Pigment can be supplied in an easy to handle water wetted form. No milling would be required to formulate inks.

THE INVENTION

The invention comprises an aqueous emulsion of a resin which contains a fluorescent dye having the following composition:

| INGREDIENTS | GENERAL % BY WEIGHT | PREFERRED % BY WEIGHT |
| --- | --- | --- |
| A water insoluble tetra polymer | 25–50 | 35–45 |
| Fluorescent Dye | .1–10.0 | 1–2 |
| Anionic Emulsifier | .2–10 | .5–2.0 |
| Water | Balance | Balance | with the tetra polymer comprising:

| INGREDIENTS | % BY WEIGHT |
| --- | --- |
| A. A water insoluble vinyl monomer free of polar groups. | 52–65 |
| B. Acrylonitrile | 25–35 |
| C. A vinyl monomer containing sulfonate groups. | 1.5–4.5 |
| D. A polar vinyl monomer from the group consisting of: <br> 1. Polar acrylate esters <br> 2. Vinyl acetate <br> 3. A substituted acrylamide containing OH or carboxylic ester groups | 5–15 |

THE TETRA POLYMER

(A) The Water Insoluble Vinyl Monomers Free of Polar Groups

While a large number of monomers fall within this category, a preferred group are the styrene monomers of which styrene is most preferred. Examples of such compounds are methylstyrene, ethylstyrene, isopropylstyrene and butylstyrene. In addition to the monoaromatic compounds, poly aromatic compounds such as vinyl naphthalene can be used.

(B) Acrylonitrile

While acrylonitrile is preferred, other equivalent vinyl nitriles may be employed that are homologs or analogs of acrylonitrile.

(C) Vinyl Monomers Containing Sulfonate Groups

The preferred monomers in this group are the vinyl sulfonates described in Hoke U.S. Pat. No. 3,666,810, the disclosure of which is incorporated herein by reference. The most preferred monomer is AMPS[1], sodium 2-acrylamido-2-methylpropane-sulfonate.

[1] Registered Trademark Lubrizol Corporation

Other vinyl sulfonates that also can be mentioned are ethylenically unsaturated sulfonic acids such as vinylsulfonic acid, allylsulfonic acid, styrene-sulfonic acid, vinylbenzylsulfonic acid, acryloyloxyethylsulfonic acid, methacryloyloxyethylsulfonic acid and a vinyl ester of an alkylsulfosuccinic acid, and salts thereof such as lithium, sodium, potassium and ammonium salts. These sulfonate containing monomers impart a high degree of stability to the emulsions.

(D) The Polar Vinyl Monomers

The polar acrylate esters represent the preferred group. In this group hydroxypropyl methacrylate is the most preferred. Other typical monomers other than vinyl acetate are the substituted acrylamide monomers containing an OH or carboxylic ester groups.

Illustrative of these monomers are N-(2,2,2-trichloro-1-hydroxyethyl) acrylamide, polypropyleneglycol monomethacrylate, methyl acrylamidoglycolate methyl ether, vinyl acetate, ethyltriglycolmethacrylate, or tetrahydrofurfurylmethacrylate. These monomers provide good color development.

THE FLUORESCENT DYES

The fluorescent dyes employed in the composition include fluorescent organics which are brilliantly fluorescent when in solution. These daylight fluorescent-types are well known in the art, and belong to the dye families known as benzothioxanthene, xanthene, coumarin, naphthalimide, benzoxanthene, perylene, and acridine. The dyes employed in the practice of the present invention may be either water soluble or insoluble and may be neutral or cationically charged. Typical dyes include Basic Red 1, Basic Violet 10, Basic Violet 11, Basic Violet 16, Basic Yellow 40, Solvent Yellow 43, Solvent Yellow 44, Solvent Yellow 131, Solvent Yellow 135 and Solvent Yellow 160.

THE EMULSIFIERS

The emulsifiers are anionic. In a preferred embodiment of the invention, the emulsifiers are sulfates and sulfonates and most usually blends thereof.

Illustrative of typical anionic emulsifiers that may be used in the practice of the invention are anionic surfactants operable in compositions suitable for use in the present invention which can be broadly described as the water-soluble salts, particularly the alkali metal or ammonium salts, of organic sulfuric acid reaction products having in their molecular structure an alkyl or alkaryl radical containing from about 8 to 22 carbon atoms and a radical selected from the group consisting of sulfonic acid and sulfuric acid ester radicals. (Included in the term alkyl is the alkyl portion of higher acyl radicals).

Examples of the anionic surfactants which can be employed in the practice of the present invention are the sodium, potassium, or ammonium alkyl sulfates, especially those obtained by sulfating the higher alcohols ($C_8$–$C_{18}$ carbon atoms) produced by reducing the glycerides of tallow or coconut oil; sodium, potassium, or ammonium alkyl benzene sulfonates in which the alkyl group contains from about 9 to about 15 carbon atoms, (the alkyl radical can be a straight or branched aliphatic chain); paraffin sulfonate surfactants having the general formula $RSO_3M$, wherein R is a primary or secondary alkyl group containing from about 8 to 22 carbon atoms (preferably 10 to 19 carbon atoms) and M is an alkali metal, e.g., sodium or potassium; sodium alkyl glyceryl ether sulfonates, especially those ethers of the higher alcohols derived from tallow and coconut oil; sodium coconut oil fatty acid monoglyceride sulfates and sulfonates; sodium, potassium, or ammonium salts of sulfuric acid esters of the reaction product of one mole of a higher fatty alcohol (e.g., tallow or coconut oil alcohols) and about 1 to 40 moles of ethylene oxide; sodium, potassium, ammonium salts of alkyl phenol ethylene oxide ether sulfates with about 1 to 40 units of ethylene oxide per molecule and in which the alkyl radicals contain from about 8 to about 12 carbon atoms; the reaction products of fatty acids esterfied with isethionic acid and neutralized with sodium hydroxide where, for example, the fatty acids are derived from coconut oil; sodium or potassium salts of fatty acid amides of a methyl tauride in which the fatty acids, for example, are derived from coconut oil and sodium or potassium B-acetoxy- or B-acetamido-alkane-sulfonates where the alkane has from 8 to 22 carbon atoms.

Further anionic emulsifiers are described in "McCutcheon's Functional Materials North American Edition," and "McCutcheon's Emulsifiers and Detergents North American Edition," The Manufacturing Confectioner Publishing Co., 1989.

PARTICLE SIZE OF THE EMULSIONS

The emulsions of the invention have an average particle size of one micron or less. For most applications requiring aqueous systems of this type, submicron particles are preferred.

PREPARATION OF THE EMULSIONS

The emulsions are prepared using typical emulsion polymerization techniques utilizing free radical catalysts such as the persulfates, peroxides and azo compounds. A typical polymerization procedure that gives satisfactory small particle emulsions is described below.

TYPICAL BATCH EMULSION POLYMERIZATION PROCEDURE

Add the water, AMPS, EDTA, other additives, dyes and surfactants to the reactor in the order listed with agitation. Mix the remaining monomers and charge to the reactor. Begin a slow nitrogen purge of the emulsion to remove oxygen and heat the bath to 50° to 55° C. Add initiator and maintain the polymerization temperature between 50° and 60° C. After 4 hours heat the batch to 85° C. and hold for 45 minutes. Cool the batch to room temperature to obtain a highly fluorescent emulsion polymer.

Using the above procedures, a typical magenta emulsion having the following formula, may be prepared:

| Magenta Emulsion | |
|---|---|
| | % by weight |
| DI Water | 56.73 |
| AMPS Sodium Salt | 1.20 |
| EDTA tetra Sodium Salt | .24 |
| Basic Red 1 | .72 |
| Basic Violet 11 | .48 |
| Sodium Dodecylbenzene Sulfonate | 1.19 |
| Ammonium Nonylphenoxypoly(ethyleneoxy)ethyl Sulfate | .40 |
| Styrene | 22.80 |
| Acrylonitrile | 14.00 |
| Hydroxypropyl Methacrylate | 2.00 |
| Potassium Persulfate | .24 |

To further illustrate a large number of useful compositions that have been prepared, Table I is set forth below.

TABLE I

FLUORESCENT EMULSIONS

| Comp. No. | Monomers/Grams | Dyes/Grams | Surfactants/Grams | Initiators/Grams |
|---|---|---|---|---|
| 1 | St:AN:TCHEA:NaAMPS<br>57:35:5:3 | BR1, BV11<br>1.8, 1.2 | A, B<br>1.0, 2.9 | KPS<br>.6 |
| 2 | St:AN:MAGME:NaAMPS<br>57:35:5:3 | BR1, BV11<br>1.8, 1.2 | A, B<br>1.0, 2.9 | KPS<br>.6 |
| 3 | St:AN:PPGMA:NaAMPS<br>57:30:10:3 | BR1, BV11<br>1.8, 1.2 | A, B<br>1.0, 2.9 | KPS<br>.6 |
| 4 | St:AN:VA:NaAMPS<br>57:35:5:3 | BR1, BV11<br>1.8, 1.2 | A, B<br>1.0, 2.9 | KPS<br>.6 |
| 5 | St:AN:PPGMA:NaAMPS<br>57:30:10:3 | BY40<br>3.0 | A, B<br>1.0, 2.9 | APS<br>.5 |
| 6 | St:AN:ETGMA:NaAMPS | BR1, BV11, | A, B | APS |

TABLE I-continued
FLUORESCENT EMULSIONS

| Comp. No. | Monomers/Grams | Dyes/Grams | Surfactants/Grams | Initiators/Grams |
|---|---|---|---|---|
|  | 52:35:10:3 | 1.8, 1.2 | 1.0, 2.9 | .5 |
| 7 | St:AN:THFMA:NaAMPS | BR1, BV11 | A, B | APS |
|  | 52:35:10:3 | 1.8, 1.2 | 1.0, 2.9 | .5 |
| 8 | St:AN:HPMA:NaAMPS | BR1, BV11, SY131 | A, B | APS |
|  | 57:35:5:3 | 0.6, 0.3, 2.1 | 1.0, 2.9 | .5 |
| 9 | St:AN:HPMA:NaAMPS | BR1, BV11 | G, B | APS |
|  | 57:25:15:3 | 1.6, 0.4 | 1.3, 2.6 | .3 |
| 10 | St:AN:HPMA:NaAMPS | BR1, BV11 | G, B | APS |
|  | 57:30:10:1.5 | 1.2, 0.5 | 1.0, 2.9 | .3 |
| 11 | St:AN:HPMA:NaAMPS | BR1, BV11 | A, B | APS |
|  | 57:35:5:1.5 | 1.5, 1.5 | 1.0, 2.9 | .4 |
| 12 | St:AN:HPMA:NaAMPS | BR1, BV11 | A, B | APS |
|  | 57:35:5:4.5 | 1.5, 1.5 | 1.0, 2.9 | .4 |
| 13 | St:AN:HPMA:NaAMPS | BR1, BV11 | A, B | APS |
|  | 57:35:5:3 | 1.5, 1.5 | 1.0, 2.9 | .5 |
| 14 | St:AN:HPMA:NaAMPS | BR1, BV11 | A, B | APS |
|  | 62:30:5:3 | 1.5, 1.5 | 1.0, 2.9 | .4 |
| 15 | St:AN:HPMA:NaAMPS | BR1, BV11 | G, F, | APS |
|  | 57:30:10:3 | 1.7, 0.3 | 1.0, 3.0 | .3 |
| 16 | St:AN:HPMA:NaAMPS:EHPTMA | BR1, BV11 | A, B | APS |
|  | 57:35:5:3:1 | 1.5, 1.5 | 1.0, 2.9 | .3 |
| 17 | St:AN:HPMA:NaAMPS:EHA | BR1, BV11, SY131 | G, B | APS, SFS |
|  | 53:27:5:3:12 | 0.5, 0.3, 1.1 | 1.5, 2.9 | .06, .09 |
| 18 | St:AN:HPMA:NaAMPS | SY131 | A, B | APS, SFS |
|  | 65:27:5:3 | 2.0 | 1.0, 2.9 | .03, .04 |

St = styrene
AN = acrylonitrile
TCHEA = 2,2,2-trichloro-1-hydroxyethylacrylamide
NaAMPS - sodium 2-acrylamido-2-methylpropane-sulfonate
BR1 = Basic Red 1
BV11 = Basic Violet 11
KPS = potassium persulfate
MAGME = Methyl Acrylamidoglycolate Methyl Ether
PPGMA = Polypropyleneglycol 150 monomethacrylate
VA = Vinyl Acetate
ETGMA = Ethyltriglycolmethacrylate
THFMA = Tetrahydrofurfurylmethacrylate
HPMA = Hydroxypropylmethacrylate
EHPTMA = 2-Ethyl-2-(hydroxy methyl)-1,3-propanediol trimethacrylate
EHA = 2-ethylhexyl methacrylate
SY131 = Solvent Yellow 131
APS = Ammonium Persulfate
SFS = Sodium formaldehyde sulfoxylate
A = ammonium nonylphenoxypoly(ethyleneoxy)ethylsulfate
B = sodium dodecylbenzenesulfonate
G = ammonium nonylphenoxypoly(ethyleneoxy)ethylsulfate
F = Sodium dihexyl sulfosuccinate
BY40 = Basic Yellow 40

Having thus described our invention it is claimed as follows.

1. An aqueous emulsion of a water insoluble tetra polymer which contains a fluorescent dye comprising:
   a) a water insoluble tetra polymer from about 25-50% by weight;
   b) fluorescent dye from about 0.1-10% by weight;
   c) anionic emulsifier from about 0.2-10% by weight; and,
   d) water from about 30-74.7% by weight;
with the water insoluble tetra polymer comprising:
   A) a water insoluble vinyl monomer free of polar groups from about 52-65% by weight;
   B) acrylonitrile from about 25-35% by weight;
   C) a vinyl monomer containing at least one sulfonate group from about 1.5-4.5% by weight; and,
   D) a polar vinyl monomer from about 5-15% by weight from the group consisting of:
      i) polar, nonchlorinated, nonepoxidized acrylate esters;
      ii) vinyl acetate; and,
      iii) a substituted acrylamide containing hydroxyl or carboxylic ester groups.

2. An aqueous emulsion of a water insoluble tetra polymer which contains a fluorescent dye comprising:
   a) a water insoluble tetra polymer from about 35-45% by weight;
   b) fluorescent dye from about 0.5-7% by weight;
   c) anionic emulsifier from about 0.5-5.5% by weight; and,
   d) water from about 46-64% by weight;
with the water insoluble tetra polymer comprising:
   A) a water insoluble vinyl monomer free of polar groups from about 52-65% by weight;
   B) acrylonitrile from about 25-35% by weight;
   C) a vinyl monomer containing sulfonate groups from about 1.5-4.5% by weight; and,
   D) a polar vinyl monomer from about 5-15% by weight from the group consisting of:
      i) polar, nonchlorinated, nonepoxidized acrylate esters;
      ii) vinyl acetate; and,
      iii) a substituted acrylamide containing OH or carboxylic ester groups.

3. The aqueous emulsion of claim 1 where the water insoluble vinyl monomer is styrene, the vinyl monomer containing sulfonate groups is sodium 2-acrylamido-2-methylpropane-sulfonate and the polar vinyl monomer is hydroxypropyl methacrylate.

4. The aqueous emulsion of claim 2 where the water insoluble vinyl monomer is styrene, the vinyl monomer containing sulfonate groups is sodium 2-acrylamido-2-methylpropane-sulfonate and the polar vinyl monomer is hydroxylpropyl methacrylate.

5. The aqueous emulsion of claim 1 where the particle size is not greater than one micron.

6. The aqueous emulsion of claim 1, wherein the polar vinyl monomer is a polar, nonchlorinated, nonepoxidized acrylate ester.

7. The aqueous emulsion of claim 1, wherein the polar vinyl monomer is vinyl acetate.

8. The aqueous emulsion of claim 1, wherein the polar vinyl monomer is a substituted acrylamide containing hydroxyl or carboxylic ester groups.

9. The aqueous emulsion of claim 2, wherein the polar vinyl monomer is a polar, nonchlorinated, nonepoxidized acrylate ester.

10. The aqueous emulsion of claim 2, wherein the polar vinyl monomer is vinyl acetate.

11. The aqueous emulsion of claim 2, wherein the polar vinyl monomer is a substituted acrylamide containing hydroxyl or carboxylic ester groups.

12. A fluorescent pigment comprising:
  I. a tetra polymer, which is comprised of:
   a) a water insoluble vinyl monomer free of polar groups from about 52–65% by weight;
   b) acrylonitrile from about 25–35% by weight;
   c) a vinyl monomer containing sulfonate groups from about 1.5–4.5% by weight; and,
   d) a polar vinyl monomer from about 5–15% by weight selected from the group consisting of:
     1) polar, nonchlorinated, nonepoxidized acrylate esters;
     2) vinyl acetate; and,
     3) a substituted acrylamide containing hydroxyl or carboxylic ester groups; and
  II. fluorescent dye.

13. The invention of claim 12 where the water insoluble vinyl monomer is styrene, the vinyl monomer containing sulfonate groups is sodium 2-acrylamido-2-methylpropane-sulfonate and the polar vinyl monomer is hydroxypropyl methacrylate.

14. The invention of claim 12 where the particle size is not greater than one micron.

15. The invention of claim 12, wherein the polar vinyl monomer is a polar, nonchlorinated, nonepoxidized acrylate ester.

16. The invention of claim 12, wherein the polar vinyl monomer is vinyl acetate.

17. The invention of claim 12, wherein the polar vinyl monomer is a substituted acrylamide containing hydroxyl or carboxylic ester groups.

* * * * *